United States Patent [19]

Palmer

[11] 4,183,059
[45] Jan. 8, 1980

[54] TRACK SKIPPER FOR A VIDEO DISC PLAYER

[75] Inventor: Richard C. Palmer, Blawenburg, N.J.

[73] Assignee: RCA Corporation, New York, N.Y.

[21] Appl. No.: 908,515

[22] Filed: May 22, 1978

[51] Int. Cl.$^2$ .......................... G11B 21/08; G11B 3/38
[52] U.S. Cl. ................ 358/128; 179/100.3 V; 179/100.4 D; 179/100.41 D; 360/10; 360/78
[58] Field of Search ............... 358/128; 179/100.3 V, 179/100.4 D, 100.41 J, 100.41 P, 100.41 M, 100.41 D, 100.41 G, ; 360/10, 11, 75, 77, 78, 107, 108, 109

[56] References Cited

U.S. PATENT DOCUMENTS

| | | | |
|---|---|---|---|
| 2,478,223 | 8/1949 | Argabrite | 179/100.41 P |
| 3,247,404 | 4/1966 | Batsch | 179/100.41 P |
| 3,842,194 | 10/1974 | Clemens | 358/128 |
| 3,963,860 | 6/1976 | Burrus | 179/100.4 D |
| 3,963,861 | 6/1976 | Crooks | 358/128 |
| 3,993,863 | 11/1976 | Leedom et al. | 358/128 |
| 4,018,984 | 4/1977 | Keizer | 358/128 |
| 4,030,124 | 6/1977 | Allen | 358/128 |

FOREIGN PATENT DOCUMENTS 2746063  4/1978  Fed. Rep. of Germany ............. 360/77

Primary Examiner—Bernard Konick
Assistant Examiner—Donald McElheny, Jr.
Attorney, Agent, or Firm—Eugene M. Whitacre; Joseph S. Tripoli; Dilip A. Kulkarni

[57] ABSTRACT

A signal pickup stylus which cooperates with an information storing spiral track on a video disc record is caused to selectively skip track convolutions of the disc record. To cause selective track skipping, the playback system includes an apparatus, responsive to an actuating signal, for twisting a stylus-carrying arm about its longitudinal axis, and the offset of the stylus tip from the rotational axis results in consequent radial motion of the stylus tip across track convolutions on the record. According to a further aspect of the invention, the lateral motion of the stylus-carrying end of the stylus arm is substantially restrained while the stylus arm is rotated to assure that the twisting of the stylus arm results in rotation of the stylus about the stylus arm axis, rather than rotation of the stylus arm about the stylus tip.

11 Claims, 16 Drawing Figures

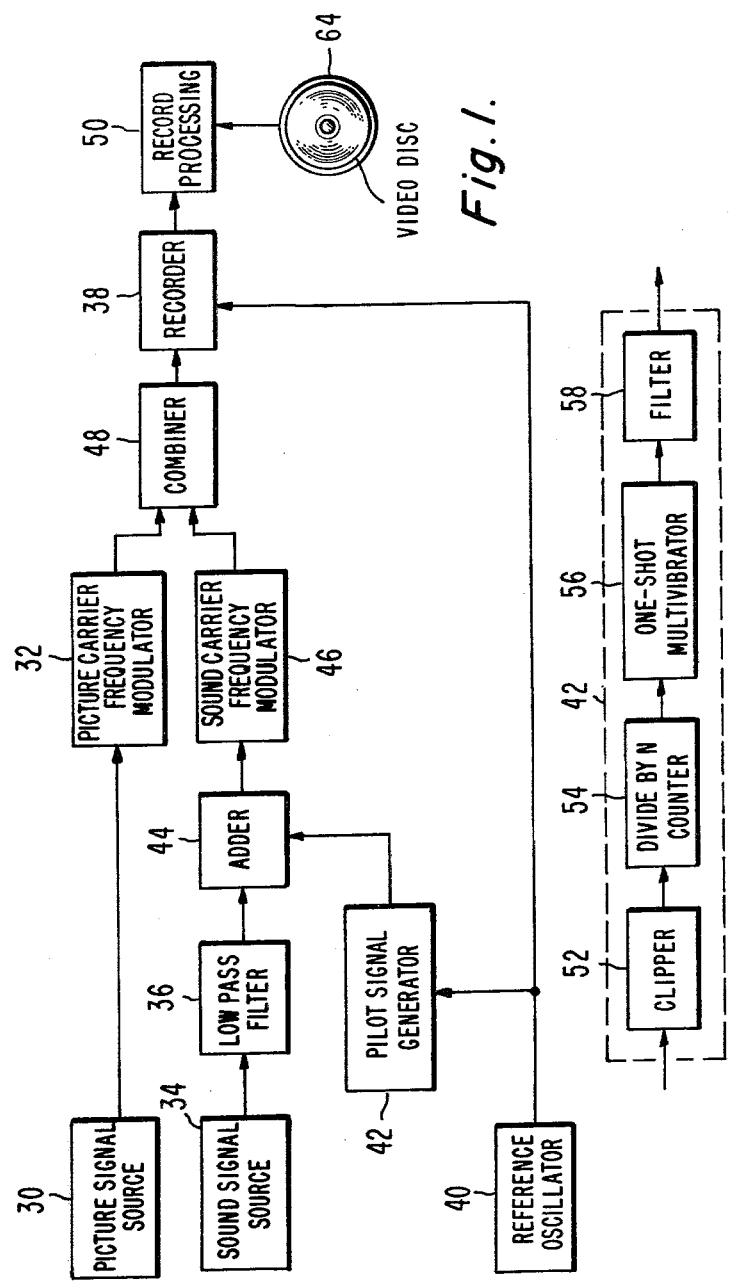

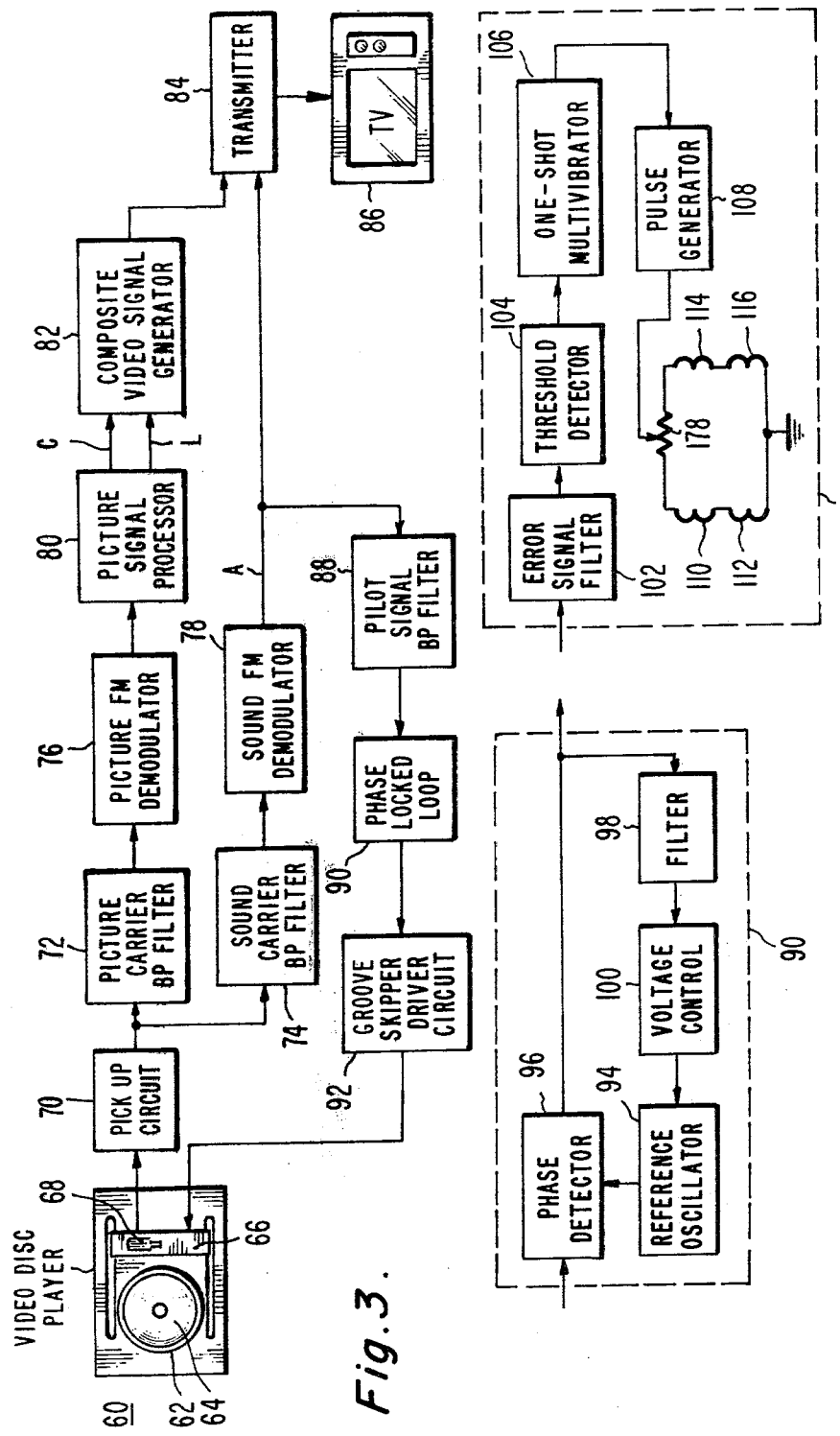

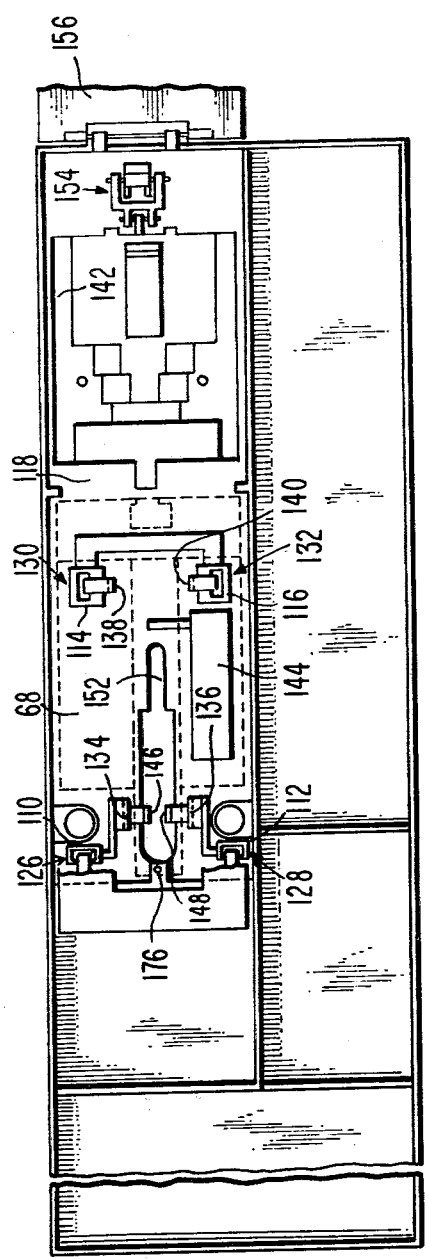
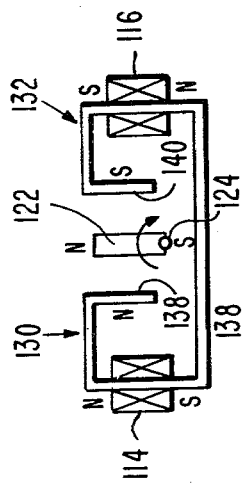
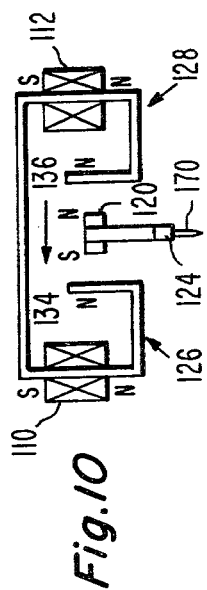
Fig. 6
Fig. 11
Fig. 10

TRACK SKIPPER FOR A VIDEO DISC PLAYER

This invention pertains to an apparatus utilized in the playback of a video disc record, and more particularly, to an apparatus for selectively repositioning a player stylus from one convolution to another of a signal-encoded spiral track disposed on the record surface.

It is noted that although the invention is herein described in detail in the context of a spirally-grooved disc, the principles of the present invention are also applicable to any disc, including a flat disc, having a sprial information track thereon.

In U.S. Pat. No. 3,842,194, issued on Oct. 15, 1974 to Jon K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In certain particular applications of a video disc system of the Clemens type, it may be desirable to provide stop motion of the displayed image. That is, to repetitively provide output signals of basically the same displayed image on an associated television monitor. Such image stop motion may be desirable for allowing a viewer to observe a particular image for relatively long lengths of time. Also, in data storage systems where it may be desirable to store frames of text book type material, the ability to linger on a particular displayed image is of particular importance.

A further desirable feature for incorporation with a video disc player is the ability to provide rapid forward motion or reverse motion of the displayed image. A rapid forward function is particularly useful for scanning information recorded on the video disc. A reverse motion function may also be utilized for aiding in data retrieval and is particularly useful as a teaching aid for reviewing an instructional picture sequence recorded on the disc.

Moreover, in the playback of disc records of the above-mentioned type, conditions are occasionally encountered when the presence of some form of defect in the disc groove causes the player stylus to skip across grooves rather than follow the successive convolutions of the spiral groove in a regular progression toward one extremity thereof. For example, as the defect is encountered, the stylus is deflected into a repeat traversal of one or more previously traversed convolutions. In some instances, the outward deflection of the stylus is repeated for a substantial number of successive encounters with the defect. This condition is herein referred to as a "locked groove" condition, producing repetitive replay of the same recorded information, with annoying effects on picture display (and accompanying sound reproduction).

To provide special effect features (e.g., stop motion, fast forward, reverse, etc.) and to correct locked groove conditions, it is desirable to provide a selectively actuated apparatus for repositioning the pickup stylus from one convolution to another of the record spiral track.

U.S. Pat. No. 3,963,861, issued on June 15, 1976 to H. N. Crooks, and U.S. Pat. No. 3,993,863, issued on Nov. 23, 1976 to Leedom, et al., illustrate groove skipping systems. In both of these groove skipping systems, selectively actuated piezoelectric bimorph elements cause lateral shifting of the stylus-carrying end of the stylus arm. While other forms of actuation, such as an electromagnetic acutation, may be substituted for the piezoelectric bimorph actuation, the lateral shifting of the stylus-carrying end of the stylus arm is relied upon in implementing the approaches of the above-mentioned Crooks and Leedom patents.

According to the present invention, selective radial repositioning of the player stylus is achieved by twisting the stylus arm about its longitudinal axis, and the offset of the stylus tip from the rotational axis results in consequent radial motion of the stylus tip across track convolutions of the disc record. It was found that twisting of the stylus arm is an effective way of coupling the point of application of the force and the stylus tip, such that a predictable stylus displacement results from a given force application.

In accordance with a further feature of the invention, the lateral motion of the stylus-carrying end of the stylus arm is substantially restrained while the stylus arm is rotated to assure that the twisting of the stylus arm results in rotation of the stylus about the axis of the stylus arm, rather than rotation of the stylus arm about the stylus tip.

In accordance with an embodiment of the present invention, a front magnet system and a rear magnet system are provided in the player apparatus to, respectively, effect the restraining action and the twisting action of the stylus arm. A feature of the magnet systems is that the restraining action and the twisting action of the stylus arm accomplished without wired connections to the stylus arm.

In the accompanying drawings:

FIG. 1 illustrates, via a block diagram representation, a system for recording a recording signal containing picture signal information inclusive of synchronizing components and a signal inclusive of sound signal information and a pilot signal on a video disc along a spiral track thereon;

FIG. 2 is a block diagram representation of an arrangement suitable for use in effecting certain functions of the recording system of FIG. 1;

FIG. 3 illustrates, via a block diagram representation, a playback apparatus incorporating a groove skip detection and correction system pursuant to this invention, and suitable for use with a video disc having a pilot signal impressed thereon in accordance with the arrangement of FIG. 1;

FIGS. 4 and 5 are block diagram representations of arrangements suitable for use in effecting certain functions of the playback apparatus of FIG. 3;

FIG. 6 shows a carriage suitable for use with the playback apparatus of FIG. 3, and adapted for housing certain elements of the groove skip detection and correction system;

FIGS. 9–11 show diagrammatic representations of the coaction of the above-mentioned cartridge and carriage elements;

Figure 12:
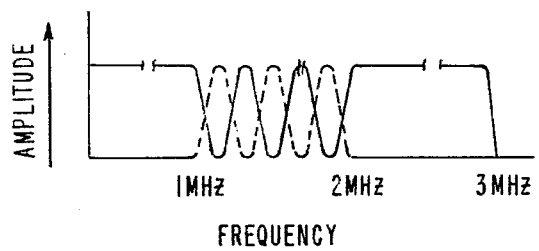
FIG. 12 shows a frequency spectrum of color video signal information in a buried color subcarrier format suitable for use in the recording system of FIG. 1.

In the recording system of FIG. 1, a picture signal source 30 supplies a video signal, inclusive of luminance information, encoded chrominance information representative of a succession of scannings of colored images to be recorded and synchronizing information, to a picture carrier frequency modulator 32. The video signal is illustratively in a buried color subcarrier format as described in U.S. Pat. No. 3,872,498, issued on Mar. 18, 1975 to D. H. Pritchard. FIG. 12 shows the frequency spectrum of the video signal in the buried subcarrier format. Pursuant to the principles of the Pritchard invention, a modulated color subcarrier, as shown by the dotted line in FIG. 12, is buried in the midband region of the luminance signal.

The picture carrier frequency modulator 32 develops at its output terminal a frequency modulated picture carrier signal, the instantaneous frequency of which is varied over a predetermined high frequency deviation range (e.g., 4.3 MHz to 6.3 MHz) in accordance with the amplitude of the video signal input.

The recording system of FIG. 1 further includes a sound signal source 34 which supplies an audio signal, representative of a desired sound accompaniment for the colored images being recorded, to a low pass filter 36 having a cutoff frequency of 20 KHz.

A recorder 38 includes a turntable for rotatably supporting a disc master on which signals are recorded along a spiral track. The recorder 38 further includes a drive system for rotating the turntable at a speed which is correlated with the picture signal synchronizing components so that the synchronizing components are radially aligned on the disc master. In other words, an integral number of synchronizing components occur per turntable revolution. The correlation between the turntable speed and picture signal synchronizing components is diagramatically represented by the connection between the recorder 38 and a reference oscillator 40.

Figure 14:
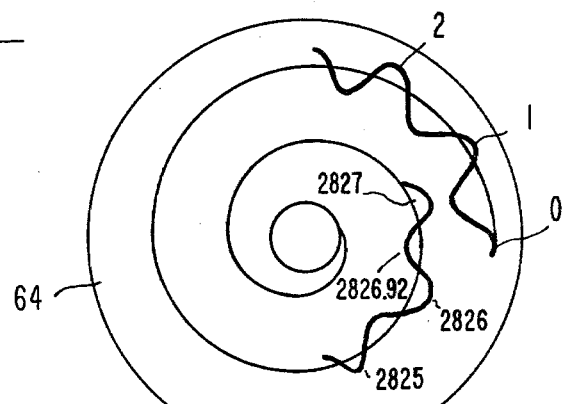
FIG. 14 shows a diagrammatic representation of a video disc having a pilot signal impressed thereon.

The reference oscillator 40, opeating at the NTSC color subcarrier frequency (i.e., 3.58 MHz), is employed in the television signal generating system to provide the synchronizing components of the picture signal. The output of the reference oscillator 40 is also supplied to a pilot signal generator 42. The pilot signal generator 42 develops at its output a pilot signal having a frequency (21.18 KHz on the playback of the disc record) such that a fixed, non-integral number of pilot signal cycles occur per turntable revolution (2826.92 when fields of picture signal information occur per disc matter revolution). Other considerations involved in arriving at this particular choice of pilot signal frequency are (1) the chosen pilot signal frequency should be higher than the useful band of audio signal information (e.g., 20 KHz) so as not to interfere with audio performance, and yet not so high as to introduce substantial increase in the bandwidth of the modulated audio carrier spectrum, (2) the chosen pilot signal frequency should be easily countable from the NTSC color subcarrier (e.g., divided by 169), and (3) the chosen pilot signal frequency should be such that the number of pilot signal cycles occupying each convolution of the spiral track differ from the integral number of pilot signal cycles by a small fraction of a cycle, at least several times smaller than half a cycle, to facilitate unambiguous detection of groove skips of more than one groove convolution. Illustratively, the choice of 0.08 cycle difference permits unambiguous detection of groove skips of up to 6 groove convolutions in either direction. FIG. 14 diagrammatically illustrates a video disc 64 having a pilot signal impressed thereon along a spiral information track. The arrow in FIG. 14 indicates the direction of rotation of the video disc relative to the player stylus.

Figure 13:
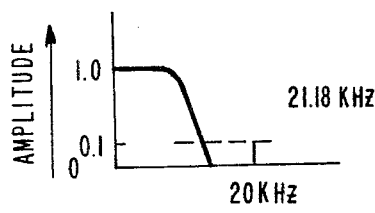
FIG. 13 illustrates a frequency spectrum of a composite signal inclusive of sound signal accompaniment of the video signal information and a pilot signal suitable for use in the recording system of FIG. 1.

An adder 44 combines the pilot signal with the sound signal at the output of the low pass filter 36 such that the pilot signal amplitude is one-tenth the peak amplitude of the sound signal. FIG. 13 shows the frequency spectrum of the signal present at the output of the adder 44.

A sound carrier frequency modulator 46 develops at its output terminal a modulated sound carrier signal, the instantaneous frequency of which is varied over a predetermined low frequency deviation range (e.g., 716 KHz±55 KHz) in accordance with the amplitude of the signal at the output of the adder 44.

A combiner 48 combines the signals at the output terminals of the picture carrier modulator 32 and the sound carrier modulator 46 to provide a composite recording signal to the recorder 38. The recorder 38 is used to generate a disc master which is utilized for the production of video disc copies 64 in the manner described in the afore-mentioned Clemens patent. The block 50 in FIG. 1 represents these production processes.

FIG. 2 shows in block diagram form an illustrative pilot signal generator 42 which derives the pilot signal by counting from the reference oscillator 40 used to synchronize the turntable in the recorder 38. A clipper 52 shapes the sinusoidal reference signal (i.e., the NTSC color subcarrier) to a square waveform suitable as an input signal to a digital divide-by-N counter 54. The counter output signal, at a repetition rate 1/169 times that of the reference signal, is shaped to a square wave by the one-shot multivibrator 56 and the fundamental component is selected by the filter 58 to furnish the desired pilot signal sine wave at 1/169 times the frequency of the reference oscillator 40.

As shown in FIG. 3, a video disc player 60 (e.g., of the type shown in the above-mentioned Clemens patent) has a turntable 62 for rotatably supporting a video disc 64 having a spiral information track containing picture signal information inclusive of the synchronizing components and a pilot signal. The frequencies of the synchronizing components and the pilot signal are such that an integral number of synchronizing components and a non-integral number of pilot signal cycles occupy each convolution of the spiral track. The player 60 further includes a carriage 66 (FIG. 6) subject to translation in synchronism with the radial motion of the player stylus during playback. The carriage 66 has a compartment for removably receiving a cartridge 68 (FIGS. 7 and 8) which houses the signal pickup assembly.

A pickup circuit 70, responsive to the output of the signal pickup, develops at its output terminal a pulse train representative of the recorded information. The pickup circuit 70 is illustratively of the type described in the U.S. Pat. No. 4,080,625, issued on Mar. 21, 1978 to Kawamoto, et al. The output of the pickup circuit 70 is delivered to a pair of bandpass filters 72 and 74. The picture carrier bandpass filter 72 has a relatively wide passband encompassing the deviation range of the high frequency picture carrier (e.g., 4.3 to 6.3 MHz) as well as the requisite adjacent sideband regions, and selectively passes the picture carrier component of the recorded signal to the relative exclusion of the sound carrier component thereof.

The sound carrier bandpass filter 74 has a relatively narrow passband encompassing the deviation range of the low frequency sound carrier (e.g., 716 KHz±55 KHz) as well as the requisite adjacent sideband regions, and selectively passes the sound carrier component of the recorded signal to the relative exclusion of the picture carrier component thereof.

The outputs of the respective bandpass filters 72 and 74 are passed to respective demodulators 76 and 78. The picture demodulator 76 develops at its output terminal the recorded picture signal information inclusive of synchronizing components (e.g., FIG. 12), and the sound demodulator 78 develops at its output the recorded audio signal information and the pilot signal (e.g., FIG. 13).

A picture signal processor 80, coupled to the picture demodulator, effects the separation of the chrominance information from the luminance information. A composite video signal generator 82 recombines the chrominance and the luminance information in accordance with, for example, the NTSC format. A transmitter 84 processes the sound, luminance and the chrominance information to form a signal suitable for delivery to a color TV receiver 86, wherein color image displays may be developed in accordance with the recorded information. Illustratively, where signal delivery to the antenna terminals of a color TV receiver is desired, the circuits include means for combining the separated components to form a new composite signal, which composite signal modulates a suitable RF carrier. U.S. patent application, Ser. No. 747,866, filed on Dec. 6, 1976 for J. P. Yu, and now U.S. Pat. No. 4,097,899, illustratively describes a transmitter apparatus.

A pilot signal bandpass filter 88 having a relatively narrow passband (e.g., 21.18 KHz±1.5 KHz) passes the recovered pilot signal to the exclusion of other recorded information. A phase locked loop 90, responsive to the deviations in the phase of the recovered pilot signal due to a disruption in the regular progression of the player stylus along the spiral track by a sudden radial shift in the location of the stylus, develops an error signal having an amplitude and a polarity indicative of the magnitude and sense of the disruption in the regular progression. A groove skipper driver circuit 92 responsive to the development of an error signal of a given sense and an amplitude exceeding a given threshold develops a standard correction pulse. A suitable groove skipper mechanism (e.g., FIGS. 9-11) responsive to the correction pulse effects a radial shift in the location of the player stylus in a manner that offsets the disruption in the regular progression of the player stylus.

FIG. 4 shows in block diagram form the elements of a phase-locked loop 90 which is used to sense sudden discontinuities of phase in the recovered pilot signal when the stylus skips to an adjacent groove. The phase of the input signal is compared to that of the reference oscillator 94 by the phase detector 96 yielding an error signal the average component of which is proportional to phase difference between input and reference signals. The error signal is filtered by the filter 98 and applied to control the frequency of the reference oscillator 94 by the voltage control 100 to bring the relative phase between the two signals to the phase detector 96 back to its nominal equilibrium value. The reference oscillator 94 thus tracks the frequency and phase of the pilot signal input with a time constant determined by the loop filter 98. When the stylus skips to another groove, the phase of the input signal jumps abruptly, as does the error signal output of the phase detector. The magnitude of the step in error signal follows the magnitude of the phase discontinuity over a range approaching 180°, and is in a direction corresponding to the direction of the input phase change. Thus the error signal can be used to indicate the direction of a stylus skip and the number of grooves skipped up to a limit of nearly one half the number of grooves required for the pilot signal to gain or lose one complete cycle measured along a radius of the record. For the illustrative case of 2826.92 pilot cycles in one revolution, the phase step will be about 28° for each groove skipped; the phase will advance for a backward skip and will retard for a forward skip. After a skip, the error signal returns to its equilibrium value at a rate determined by the filter and the loop gain, and if no further skips occur the reference oscillator 94 continues tracking the newly established phase of the pilot signal input averaged over a time interval determined by the loop filter 98. The functions of the phase detector 96, voltage control 100 and reference oscillator 94 are conveniently combined in the CD4046AE Digital Integrated Circuit (COS/MOS Micropower Phase-Locked Loop).

FIG. 5 shows in block diagram form the elements used to perform limited correction of skipped grooves by energizing the groove skipper on receipt of error signals from the PLL 90. The correction system illustrated advances the stylus a nominally fixed number of grooves upon detection of a backward skip of at least one groove. This limited correction suffices to eliminate the very objectionable case of a record defect which causes the stylus to jump backwards one groove and repeatedly play the same groove when the defect is encountered again after one revolution of the record. It will be obvious to one skilled in the art that, since the magnitude and direction of a skip can be determined from the PLL error signal, the stylus can be relocated to a continuation of the very same groove from which it was displaced.

The error signal filter 102 in FIG. 5 is chosen together with the PLL loop filter 98 to discriminate most effectively against noise and spurious signals in the error signal and to maximize the peak voltage resulting from a phase step compared to the peak of the spurious and noise signals. The presence of a phase step corresponding to a backwards skip of at least one groove is then detected by a threshold detector 104, the output of which is used to trigger a one-shot multivibrator 106. The multivibrator 106 serves two purposes: (1) it introduces an inactive period (e.g., 10 milliseconds) during which time the system is unresponsive to PLL error signals and which allows tracking in the new groove to be resumed and the PLL to re-stabilize, and (2) it provides a standardized signal to the pulse generator 108. The pulse generator 108 when triggered by the multivibrator 106 delivers a standard correction pulse (e.g., amplitude=0.3 volts, duration=1.0 millisecond) to the groove skipper electromagnets 110–116 which advances the stylus by about three grooves, as described above. As will be described more fully later, electromagnets 110-116 are located in proximity to the stylus arm.

A nominal advance of 3 grooves has been used and found to correct backward skips with very little subjective interruption of the program being played from the video disc. The current from the pulse generator 108 is proportioned between the front and rear electromagnets 126-132 to secure the most consistent groove skipping action and to compensate for differences in the strengths of magnets 120 and 122 mounted on a particular stylus assembly.

The track skipper apparatus will now be described with the aid of FIGS. 6-11. FIG. 6 depicts a carriage 66 having a compartment 118 for removably receiving a cartridge 68, shown in dotted line in FIG. 6 and also illustrated in FIGS. 7 and 8, which houses the player stylus assembly. FIGS. 9-11 diagrammatically illustrate the operation of the track skipper apparatus.

The track skipper apparatus comprises a pair of permanent magnets 120 and 122 fixedly attached to the stylus arm 124 (FIGS. 7, 8 and 9-11) and a set of electromagnets 126, 128, 130 and 132 mounted in the carriage 66 (FIGS. 6 and 9-11) for coaction with the permanent magnets attached to the stylus arm. The front electromagnets 126 and 128 are energized, respectively, by windings 110 and 112, and are provided with pole faces 134 and 136. The rear electromagnets 130 and 132 are energized, respectively, by windings 114 and 116, and are provided with pole faces 138 and 140.

The carriage 66 houses an armstretcher apparatus 142 for imparting a translatory motion to the stylus arm in a manner that compensates for cyclical deviations in the stylus/record relative velocity during playback. The cyclical deviations in the stylus/record relative velocity result from a number of sources, for example, turntable eccentricity, mounting inaccuracies, record warp, etc., to name a few. U.S. Pat. No. 3,983,318, issued on Sept. 28, 1976 to M. E. Miller, et al., describes an illustrative armstretcher apparatus.

A stylus arm lifting/lowering apparatus 144 is mounted in the carriage 66 for gently lowering the player stylus onto the video disc for playback. U.S. Pat. No. 4,053,161, issued on Oct. 11, 1977 to J. C. Bleazey, et al., illustratively describes a stylus arm lifting/lowering apparatus.

A pair of stonewalls 146 and 148 provided in the carriage 66 for coaction with a chimney 150 secured to the front end of the stylus arm 124 (FIGS. 7-9) serve to laterally position the stylus for play during stylus setdown on the disc, and also serve as an ultimate locked groove clearance device. U.S. Pat. No. 3,961,131, issued on June 1, 1976 to B. K. Taylor, describes a passive locked groove clearance mechanism employing a stonewall arrangement. The passive system employing the stonewall/chimney combination is not normally used for clearing locked grooves occurring during operation of the player, and is provided for standby reasons.

The carriage 66, shown in FIG. 6, is provided with an opening 152 to permit the player stylus to protrude therethrough during playback to effect stylus/record engagement, when the stylus arm 124 is lowered by the stylus arm lifting/lowering apparatus 144.

A mechanism 154 effects cartridge/armstretcher engagement when the carriage lid 156 is closed during the containment of the cartridge 68 within the carriage compartment 118.

Figure 7:
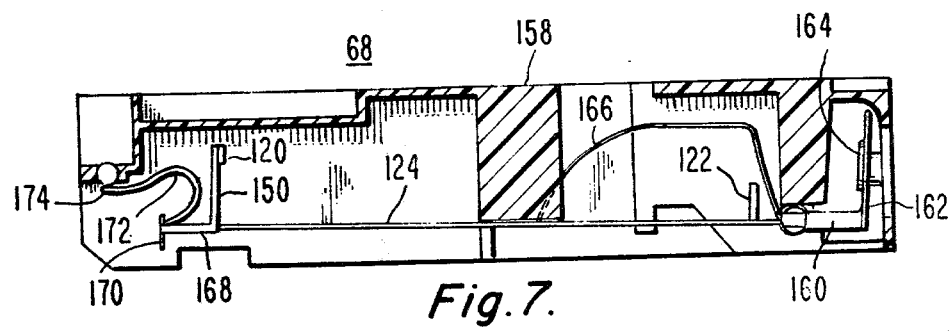
FIGS. 7 and 8 illustrate, respectively, a sectional end view and a plan view of a stylus arm cartridge which is removably received in a compartment in the carriage of FIG. 6; the stylus arm cartridge being suitable for housing certain other elements of the groove skip detection and correction system of FIG. 3 which are disposed for coaction with the above-mentioned carriage elements.
Figure 8:
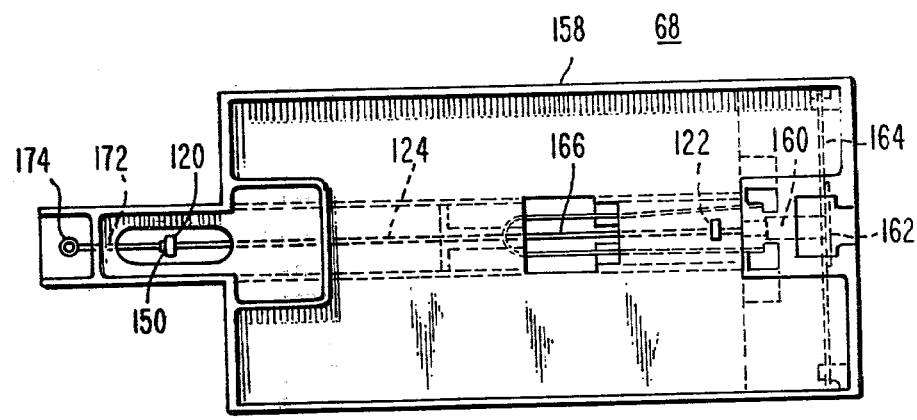
Figure 9:
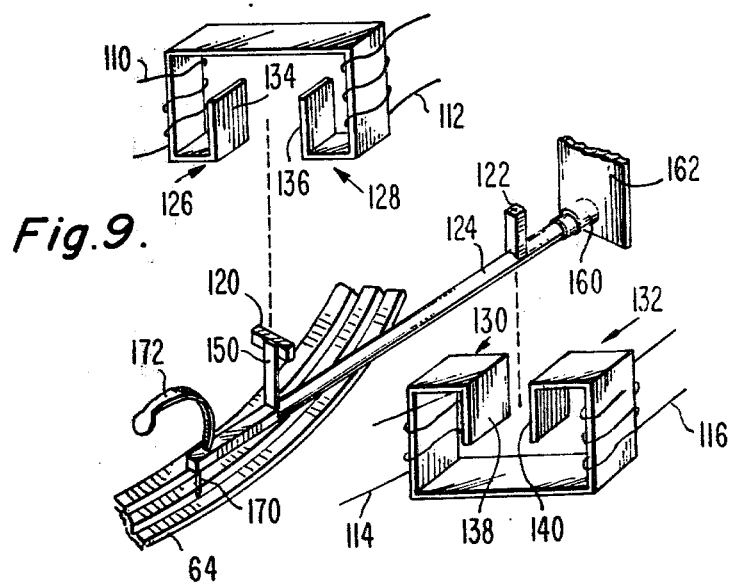

The replaceable cartridge 68, shown in FIGS. 7 and 8 is generally of the type described in U.S. Pat. No. 4,030,124, issued on June 14, 1977 to J. A. Allen. Basically, the cartridge 68 comprises a body 158, a compliant coupler 160 securing the stylus arm 124 to the rear plate 162, suspension means 164 for flexibly mounting the rear plate within the cartridge body, a spring 166 for selectively retaining the stylus arm within the confines of the cartridge body, a stylus holder 168 securing the player stylus 170 to the stylus arm, and a leaf spring 172 electrically connecting an electrode incorporated in the player stylus to a terminal 174 provided in the cartridge body.

When the cartridge 68 is received in the carriage compartment 118 and the lid 156 is closed, the terminal 174 provided in the cartridge body contacts the terminal 176 provided in the carriage for electrically connecting the stylus electrode to the rest of the player circuitry and the armstretcher 142 is coupled to the rear plate 162 of the cartridge for transmitting cyclical armstretcher motion to the stylus 170. From FIG. 6, it will be seen that, when the cartridge 68 is received in the carriage compartment 118, the poles 134 and 136 are located adjacent to the front magnet 120, and the poles 138 and 140 are located near the rear magnet 122. The rear electromagnets 130 and 132 are dimensioned to fit inside the recesses in the cartridge body 158.

The operation of the track skipping apparatus will now be described in conjunction with FIGS. 9-11. The polarity of the pole faces 134-140 is as shown in FIGS. 10 and 11 when the respective electromagnets are energized in response to the development of an error signal upon occurrence of a locked groove.

The orientation of the rear magnet 124 is such that energization of the rear electromagnets 130 and 132 causes twisting of the stylus arm about its longitudinal axis in a clockwise direction viewed from the stylus end and as can be seen from FIG. 11, and the offset of the stylus point from the rotational axis results in a consequent inward radial motion of the stylus point across the grooves on the record in a manner that clears the locked groove condition.

While the track skipping apparatus employing the rear magnet system alone can work satisfactorily, it was found that the addition of the front magnet system enhances the performance of the track skipping apparatus when multiple groove skips (e.g., across 30-20 groove convolutions) are desirable.

The orientation of the front magnet 120 is such that energization of the front electromagnets 126 and 128 produces forces that restrain lateral motion of the front end of the stylus arm 124, without hindering the twisting motion thereof. For example, the outward lateral motion of the stylus arm is resisted when effecting inward radial motion of the stylus tip. The resultant reduction in the sideways motion of the stylus arm front end, and reduction in the consequent oscillations thereof, assures more reliable operation of the track skipping apparatus. Further, the lateral restraint assures that the twisting of the stylus arm results in rotation of the stylus about the stylus arm axis, rather than rotation of the stylus arm about the stylus tip.

Figure 15:
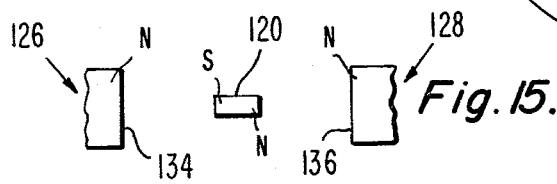
FIGS. 15 and 16 illustrate coaction of certain cartridge and carriage elements of FIGS. 6-11.
Figure 16:
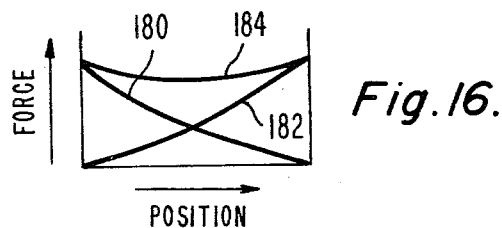

From FIGS. 15 and 16, it will be seen that the total lateral force on the front magnet 120 is relatively independent of the position of the front magnet within the operating range thereof. In FIG. 16, curves 180 and 182, respectively, represent lateral forces developed by the pole faces 134 and 136. The curve 184 in FIG. 16 represents the total lateral force on the front magnet 120.

Relative excitations of the front and rear electromagnets are adjusted to reduce the sideways motion of the stylus arm to a minimum as the stylus arm is rotated about its longitudinal axis to move the stylus tip from one groove convolution to another. This adjustment is made, for example, by proportioning the energization current passed through the front and rear winding by means of a resistor 178 shown in FIG. 5.

It is desirable to employ a relatively powerful front electromagnet system so that the front magnet secured to the stylus arm can be relatively small, thereby reducing the mass added to the stylus arm assembly at its front end. It will be noted that location of the front magnet 120 at the top of the chimney 150 allows lateral forces to be developed by the front electromagnets contained within the carriage, when the stylus arm 124 is lowered during playback to effect stylus/record engagement.

With respect to the rear magnet system, it will be noted that:

(1) the rear magnet system twists the stylus arm about its longitudinal axis which is an effective way of coupling the point of application of the force and the stylus tip, such that a predictable stylus displacement results from a given force application;

(2) the location of the rear magnet near the rear coupler assures that its motions due to record eccentricity and warpage are reduced;

(3) since the rear portion of the stylus arm to which the rear magnet is attached is inside the arm cage when the stylus arm is lowered during playback to effect stylus/record engagement, the rear electromagnet can be housed within the carriage; and (4) the rearward location of the rear magnet reduces its effect on the dynamic characteristics of the stylus arm assembly.

It will be noted that while the description herein is in the context of grooved discs, it is equally applicable to flat discs. Various defects on flat discs can cause the player stylus to retrace the same track again and again. The system described herein can be advantageously employed to clear such a condition in the playback of a flat disc in accordance with the principles of the present invention.

What is claimed is:

1. In a system for recovering prerecorded information from a disc record having a spiral information track by a track-following stylus when stylus/record relative velocity is established; wherein normal operation of said system involves sensing of said prerecorded information along successive convolutions of said spiral track in a regular progression toward one extremity; a combination comprising:
   (A) a stylus arm having a longitudinal axis, and carrying said track-following stylus at one end thereof;
   (B) means for yieldably supporting the end of said stylus arm remote from said one end; and
   (C) selectively actuated means for twisting said stylus arm about said longitudinal axis thereof to cause a shift in the radial location of said track-following stylus.

2. A combination as defined in claim 1 further including (A) means for developing an error signal indicative of a disruption in said regular progression by an undesired shift in the radial location of said track-following stylus, and (B) means, responsive to the development of said error signal, for selectively actuating said selectively actuated twisting means to cause a shift in the radial location of said track-following stylus in a manner that offsets said disruption of said regular progression.

3. A combination as defined in claim 2 wherein said selectively actuated twisting means comprises:
   (A) a permanent magnet secured to said stylus arm; and
   (B) an electromagnet for providing a controllable magnetic field of a given polarity when energized by said selectively actuating means; said electromagnet being located such that an interaction can take place between said permanent magnet and said controllable magnetic field;
   wherein said securing of said permanent magnet to said stylus arm is such that said energization causes said twisting of said stylus arm about said longitudinal axis thereof to effect said radial shift in the location of said track-following stylus.

4. A combination as defined in claim 3 wherein said permanent magnet is secured to said stylus arm adjacent to said remote end thereof.

5. A combination as defined in claim 4 wherein said selectively acutating means comprises means responsive to the development of said error signal of a given sense and an amplitude exceeding a given threshold for developing a standard correction pulse for applicaton to said electromagnet.

6. In a system for recovering prerecorded information from a disc record having a spiral information track by a track-following stylus when stylus/record relative velocity is established; wherein normal operation of said system involves sensing of said prerecorded information along successive convolutions of said spiral track in a regular progression toward one extremity; a combination comprising:
   (A) a stylus arm having a longitudinal axis and carrying said track-following stylus at one end thereof;
   (B) means for yieldably supporting the end of said stylus arm remote from said one end;
   (C) selectively actuated means for twisting said stylus arm about said longitudial axis thereof to cause a shift in the radial location of said track-following stylus; said selectively actuated twisting means including a permanent magnet secured to said stylus arm adjacent to said remote end thereof and an electromagnet for providing a controllable magnetic field of a given polarity when energized; said electromagnet being located such that an interaction can take place between said permanent magnet and said controllable magnetic filed; wherein said securing of said permanent magnet to said stylus arm is such that said energization causes said twisting of said stylus arm about said longitudinal axis thereof to effect said radial shift in the location of said track-following stylus;
   (D) means for developing an error signal indicative of a disruption in said regular progression by an undesired shift in the radial location of said track-following stylus;
   (E) means, responsive to the development of said error signal, for selectively actuating said selectively actuated twisting means to cause a shift in the radial location of said track-following stylus in a manner that offsets said disruption of s᠎ 1 regular progression; said selectively acutating means including means responsive to the development of said error signal of a given sense and an amplitude exceeding a given threshold for developing a standard correction pulse for application to said electromagnet; and (F) means responsive to said error signal for substantially restraining said one end of said stylus arm in a direction radially disposed relative to said disc record, while allowing said twisting of said stylus arm about said longitudinal axis thereof.

7. A combination as defined in claim 6 wherein said error signal responsive restraining means comprises:

(A) a second permanent magnet secured to said stylus arm near said one end thereof;

(B) a second electromagnet for providing a controllable magnetic field of a given polarity when energized by said selectively actuating means; said second electromagnet being located near said one end of said stylus arm such that an interaction can take place between said second permanent magnet and said second electromagnet; and (C) means coupled to said correction pulse developing means for energizing said second electromagnet;

wherein said securing of said second permanent magnet to said stylus arm is such that said energization causes said substantial restraint of said one end of said stylus arm in said radial direction, while permitting said twisting of said stylus arm.

8. A combination as defined in claim 7 for use with said information recovering system further including a carriage subject to a translatory motion in correlation with radial motion of said track-following stylus during playback for carrying said yieldable supporting means; wherein said carriage has an opening near said one end of said stylus arm for permitting said track-following stylus to protrude therethrough when said stylus is lowered during playback; wherein said one end of said stylus arm is provided with an extension having an end projecting into said carriage while said stylus is lowered for playback; wherein said projecting end of said extension carries said second permanent magnet; wherein said carriage additionally houses said electromagnets.

9. A pickup cartridge comprising:

(A) a cartridge body;

(B) a stylus;

(C) a stylus arm having a longitudinal axis and carrying said stylus at one end thereof;

(D) means for yieldably supporting the end of said stylus arm remote from said one end in said cartridge body;

(E) means for selectively retaining said stylus arm within the confines of said cartridge body;

(F) said cartridge body having an opening near said one end of said stylus arm for allowing said stylus to protrude therethrough for playback; p1 (G) a first permanent magnet having an axis and secured to said stylus arm near said remote end thereof; and (H) a second permanent magnet also having an axis and secured to said stylus arm near said one end thereof such that said axes of said permanent magnets are mutually orthogonal.

10. A cartridge as defined in claim 9 wherein said axes of said permanent magnets are disposed perpendicular to said longitudinal axis of said stylus arm.

11. A cartridge as defined in claim 10 for use with a system for recovering prerecorded information from a disc record having a spiral information track by a track-following stylus when stylus/record relative velocity is established; wherein normal operation of said system involves sensing of said prerecorded information along successive convolutions of said spiral track in a regular progression toward one extremity; said system including a carriage subject to a translatory motion in correlation with radial motion of said stylus during playback; said carriage having a compartment for removably receiving said cartridge; said carriage having an opening near said one end of said stylus arm for allowing said stylus to extend therethrough when said stylus is lowered during playback; said one end of said stylus arm being provided with an extension having an end which protrudes into said carriage while said stylus is lowered for playback; said protruding end of said extension carrying said second permanent magnet; said system including a first electromagnet mounted in said carriage near said first permanent magnet and a second electromagnet also mounted in said carriage near said second permanent magnet; said system further including means for energizing said electromagnets when a disruption occurs in said regular progression by an undesired shift of the radial location of said stylus; the orientation of said first permanent magnet being such that said energization of said first electromagnet causes twisting of said stylus arm about its longitudinal axis; the orientation of said second permanent magnet being such that said energization of said second electromagnet causes substantial restraint of said one end of said stylus arm in a direction radially disposed relative to said record; said twisting and said radial restraint effecting a shift in the radial location of said stylus in a manner that offsets said disruption in said regular progression.

* * * * *

UNITED STATES PATENT AND TRADEMARK OFFICE
CERTIFICATE OF CORRECTION

PATENT NO. : 4,183,059
DATED : January 8, 1980
INVENTOR(S) : RICHARD CLAXTON PALMER It is certified that error appears in the above-identified patent and that said Letters Patent is hereby corrected as shown below:

Column 3, line 49 - change "opeating" to -- operating --
Column 10, line 52 - change "filed" to -- field --
Column 12, line 5 - delete "pl" -- start new paragraph with (G)

Signed and Sealed this

Twenty-fourth Day of June 1980

[SEAL]

Attest:

SIDNEY A. DIAMOND

Attesting Officer
Commissioner of Patents and Trademarks